G. D. Harris,
Stump Elevator.
№ 23,464.        Patented Apr. 5, 1859.

Witnesses

Inventor
Gordis D Harris

UNITED STATES PATENT OFFICE.

G. D. HARRIS, OF FITCHBURG, MASSACHUSETTS.

STUMP-EXTRACTOR.

Specification of Letters Patent No. 23,464, dated April 5, 1859.

*To all whom it may concern:*

Be it known that I, GORDIS D. HARRIS, of Fitchburg, in the county of Worcester and State of Massachusetts, have invented a new and Improved Machine for Extracting Tree-Stumps; and I do hereby declare that the following is a full, clear, and exact description of the same, reference being had to the annexed drawings, making a part of this specification, in which—

Figure 1:
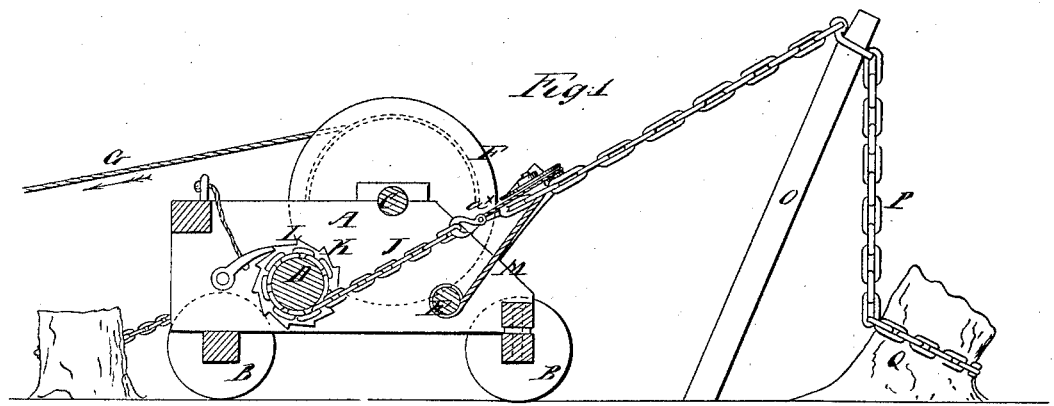
Figure 2:
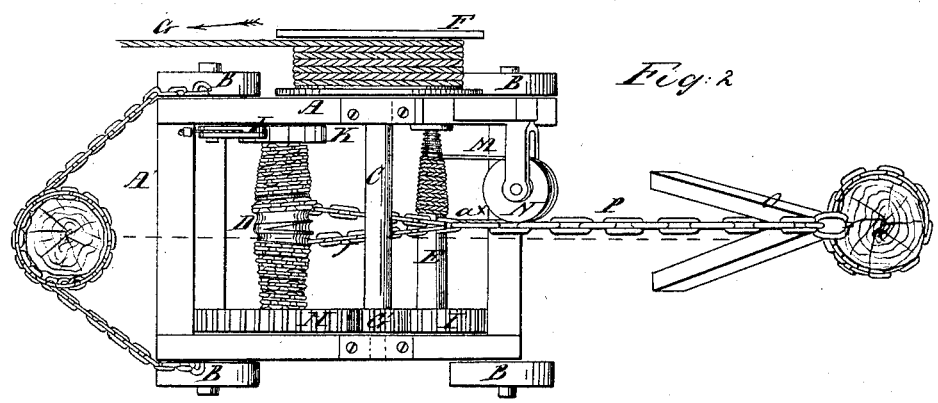

Figure 1, is a longitudinal vertical section of my invention taken in the line $x, x$ Fig. 2. Fig. 2, is a plan or top view of ditto.

Similar letters of reference indicate corresponding parts in the two figures.

To enable those skilled in the art to fully understand and construct my invention I will proceed to describe it.

A represents a frame which is mounted on wheels B, B, and C, D, E, are three parallel shafts which are placed in the frame A. The shaft C, is the driving shaft and has a pulley F, on one end at the outer side of the frame, said pulley having a grooved or sunken periphery to receive a rope or chain G, to which the animal is attached, and by which power is communicated to the machine. On the opposite end of the shaft C, a pinion G′, is placed, said pinion being within the frame and gearing into a wheel H, which is placed at one end of the shaft D. The wheel H, also gears into a pinion I, on the shaft E.

The shaft D, is of double conical form, that is to say, it decreases gradually in diameter from its center toward both ends as shown clearly in Fig. 2, and the shaft is grooved spirally from its ends to its center, one groove being in a reverse position to that of the other, or in other words, one is a left and the other a right hand groove.

J, is a chain, the ends of which are attached to the shaft D, so that as the shaft D, is turned the two ends of the chain will be wound on or off from the two parts of the shaft D. This will be clearly understood by referring to Fig. 2. On the ends of the shaft D, opposite to that where the wheel H, is attached, a ratchet K, is placed, and L, is a holding pawl which is attached to the frame A, and catches into said ratchet, preventing it and consequently the shaft D, from turning backward when not required. The shaft E, at one end, is also made of conical form and is grooved spirally and has a rope M, attached, said rope passes around a pulley N, on the frame A, and is attached to the chain J, at its outer end as shown at $a^x$.

O, is a strut the lower end of which rests on the ground near the stump Q, to be extracted, and P, is a chain one end of which is attached to the stump Q, said chain passing over the top of the strut O, and having its opposite end attached to the outer end of the chain J. The strut O, is merely a V-shaped frame, the pointed end being upward.

When the machine is placed in a proper position relatively with the stump Q, to be extracted, and the chain P, adjusted around said stump and over the strut O, and the back part of the machine secured by a chain A′, or by other proper means, the animal is attached to the rope G, and made to move along in the direction indicated by the arrow, the chain J, will be wound on the shaft D, and with a progressive or increasing power, owing to the conical form of the shaft D. The ends of the chain J, in consequence of being attached to the outer and smaller ends of the shaft D, will at first act slowly upon the strut O, and gradually increase in speed as it is wound on said shaft and approaches its center. The maximum power of the machine is therefore obtained when most needed, to wit, at the commencement of the pull, in order to loosen the stump. As the stump is loosened the power is decreased and the speed consequently increased in a corresponding ratio. As the stump Q, is drawn out of the ground and the chain J, wound on the shaft D, the rope M, is unwound from the shaft E, and when the animal is "backed" and the pulley F, turned to wind the rope G, on said pulley for a succeeding operation, the rope M, takes up the slack of the chain J, as it unwinds from the shaft D, so as to admit of the ready adjustment of the chain P, to the stump to be next operated upon. The rope M, therefore passing around the pulley N, as shown and described, saves the operator the trouble of drawing out the chain J, by hand in order to adjust the strut O, and attach the chain P, to the stump.

By this invention stumps may be extracted very expeditiously and the machine may be readily applied to its work. By having the shaft D, of double conical form an equal strain is obtained on each side of the machine and the machine retained in proper position, at least there will be no lateral strain which would have a tendency to move it out of its proper place.

I do not claim any of the parts separately; but,

Having thus described my invention, I claim and desire to secure by Letters Patent—

As an improved article of manufacture, a stump-puller having a pulley N, and two conical shafts D, E, one shaft D for winding the chain with a variable speed, the other shaft E, for correspondently winding the rope M, and otherwise constructed as herein shown and described.

GORDIS D. HARRIS.

Witnesses:
C. H. B. SNOW,
AMASA NORCRESS.